United States Patent
Hyun

(10) Patent No.: US 10,694,728 B2
(45) Date of Patent: Jun. 30, 2020

(54) FISHING REEL HAVING TENSION NUT RETAINER

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Gyeonggi-Do (KR)

(*) Notice: Subject to any disclaimer, the term of this patent is extended or adjusted under 35 U.S.C. 154(b) by 274 days.

(21) Appl. No.: 15/884,795

(22) Filed: Jan. 31, 2018

(65) Prior Publication Data
US 2018/0220635 A1    Aug. 9, 2018

(30) Foreign Application Priority Data
Feb. 3, 2017 (KR) ........................ 10-2017-0015825

(51) Int. Cl.
*A01K 89/01* (2006.01)
*A01K 89/033* (2006.01)

(52) U.S. Cl.
CPC .................................. *A01K 89/051* (2015.05)

(58) Field of Classification Search
CPC ... A01K 89/057; A01K 89/051; A01K 89/029
See application file for complete search history.

(56) References Cited

U.S. PATENT DOCUMENTS

| | | | |
|---|---|---|---|
| 4,702,431 A * | 10/1987 | Kaneko | A41H 1/02 242/246 |
| 4,796,828 A * | 1/1989 | Councilman | A01K 89/01123 242/245 |
| 2005/0023393 A1* | 2/2005 | Kitajima | A01K 89/0114 242/245 |
| 2012/0056028 A1* | 3/2012 | Kawasaki | A01K 89/006 242/267 |
| 2012/0248233 A1* | 10/2012 | Saito | A01K 89/0155 242/289 |
| 2013/0233957 A1* | 9/2013 | Niitsuma | A01K 89/015 242/285 |
| 2016/0100563 A1* | 4/2016 | Maruoka | A01K 89/05 242/295 |

FOREIGN PATENT DOCUMENTS

| | | |
|---|---|---|
| JP | 11046641 | 2/1999 |
| KR | 2020110005400 | 6/2011 |
| KR | 101185103 | 9/2012 |
| KR | 101218315 | 1/2013 |
| KR | 2020130004509 | 7/2013 |

* cited by examiner

*Primary Examiner* — Emmanuel M Marcelo
(74) *Attorney, Agent, or Firm* — Cantor Colburn LLP

(57) ABSTRACT

Provided is a fishing reel having a tension nut retainer and, more particularly, a fishing reel having a tension nut retainer that prevents a tension nut from separating from a nut seat by being locked to the structure of a frame when the tension nut is moved to an end of the nut seat in order to prevent loss of the tension nut that is used to adjust tension of a spool.

4 Claims, 15 Drawing Sheets

FISHING REEL HAVING TENSION NUT RETAINER

CROSS REFERENCE TO RELATED APPLICATION

The present application claims priority to Korean Patent Application No. 10-2017-0015825, filed Feb. 3, 2017, the entire contents of which is incorporated herein for all purposes by this reference.

BACKGROUND OF THE INVENTION

Field of the Invention

The present invention relates to a fishing reel having a tension nut retainer and, more particularly, a fishing reel having a tension nut retainer that prevents a tension nut from separating from a nut seat by being locked to the structure of a frame when the tension nut is moved to an end of the nut seat in order to prevent loss of the tension nut that is used to adjust tension of a spool.

Description of the Related Art

As shown in FIG. 10, a tension nut, which adjusts tension of a spool for winding or unwinding a fishing line by pressing an end of the shaft of a spool so that the rotational speed of the spool can be adjusted, is disposed on a side of the frame of common fishing reels.

When the tension is tightened into a nut mount, pressure (tension) applied to both ends of the spool shaft is increased, so the rotational speed of the spool is reduced. In contrast, when the tension nut is loosened outward from the nut seat, the pressure applied to both ends of the spool shaft is decreased, so the rotational speed of the spool is increased.

Common nuts of the related art are formed in a kind of cap shape and thread-fastened to the nut mount of a frame such that the tension nut is moved left and right with respect to the tension mount, depending on the rotational direction thereof, thereby adjusting the tension applied to the spool shaft.

However, existing tension nuts are simply thread-fastened to a nut mount without a specific safety lock, so the tension nuts are frequently separated from the nut mount and lost due to carelessness of users.

In other words, there is no concern about loss of a tension nut when the tension nut is tightened to be moved toward a frame to increase the tension of a spool. However, when the tension nut is excessively loosened away from the frame, the tension nut may be easily separated while being loosened.

Accordingly, when the tension nut comes in contact with an object or receives external shock while a user fishes with the tension of the spool minimized, the tension nut is fully loosened, separated from the nut mount, and lost regardless of intention of the user in many cases.

In particular, common tension nuts have a clicker so that a user can easily aurally know the degree of fine rotation when he/she tightens or loosens the tension nut.

When a user loses a tension nut by mistake during fishing, the components of the clicker in the tension nut may also be separated and lost.

Further, when a user keeps fishing with a tension nut separated, water or moisture can easily flow into the frame through the nut mount, which may causes malfunction or breakage of the complicated connection structures of various gears and/or shafts in the frame.

In relation to these tension nuts, there are Korean Patent No. 10-1218315, Korean Utility Model Application Publication No. 20-2011-0005400, Korean Patent No. 10-1185103, etc.

SUMMARY OF THE INVENTION

The present invention has been made in an effort to solve the problems.

An object of the present invention is to provide a fishing reel having tension retainer that can prevent a tension nut from being separated by being locked to the structure of a frame when the tension nut is rotated to be moved away from the frame, that is, provided is an end of a nut mount, in order to prevent unexpected separation and loss of the tension nut regardless of intension of a user during fishing.

In particular, an object of the present invention is to provide a fishing reel having a tension nut retainer that can be easily manufactured at a low cost by being implemented in various shapes, depending on the detailed configuration of fishing reels, such as a retaining ring that is disposed on a hook or a nut mount disposed on an inner plate of a separate cap or clicker.

A fishing reel including a tension nut retainer adjusting torque of a spool of the present invention, includes: a frame having a nut mount; a tension nut thread-fastened to an outer side of the nut mount and moving in an axial direction of a spool shaft such that a distance can be adjusted; and a retainer locking the tension nut to a structure of the frame to prevent the tension nut from being separated from the nut mount when the tension nut is loosened and moved from a first end of the nut mount.

The retainer may include: a cap coupled to the frame to cover the nut mount to form a gap in which a second end of the tension nut is inserted, and having a retaining step protruding from an inner side thereof; and a retaining portion formed on outer side of the tension nut and protruding to be locked to the retaining step.

The retaining portion may be composed of retaining rings that are an O-ring or a C-ring.

The retaining step may have ridges on an inner side thereof, the retaining portion may be a threaded tap engaged with the ridges, and the threaded tap may be coupled to idle in an insertion portion.

In the fishing reel, a fitting hole may be formed through the nut mount in an axial direction of the spool shaft, the tension nut may include an inner plate on an inner side thereof, moving with the tension nut, and having a fitting projection protruding from a second side to be inserted in the fitting hole, and the retainer may be composed of hook portions protruding from an outer side or an inner side of the fitting projection to be locked to a first end of the fitting hole.

In the fishing reel, the retainer may be composed of a retaining ring fitted on an outer side of the nut mount and a locking step protruding inward from a second end of the tension nut to be locked to the retaining ring.

In the fishing reel, the retaining ring may have a retaining step protruding outward at a first end to lock the locking step.

In the fishing reel, the nut mount may have a fitting groove recessed on the outer side thereof, and the retaining ring may have a fitting portion protruding inward to be fitted in the fitting groove.

According to the fishing reel having a tension nut retainer of the present invention, even though the tension nut is moved in a predetermined direction on the nut mount to maximize torque of the spool, the tension nut is locked without separating by various frame structures such as the separate cap, the inner plate, or the retaining rings, thereby preventing separation of the tension nut. Accordingly, it is possible to prevent separation and loss of the tension nut regardless of intention of a user during fishing.

The tension nut retainer can be variously and easily applied to fit to the details of fishing reels, so the fishing reel can be easily manufactured and the manufacturing cost can be reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
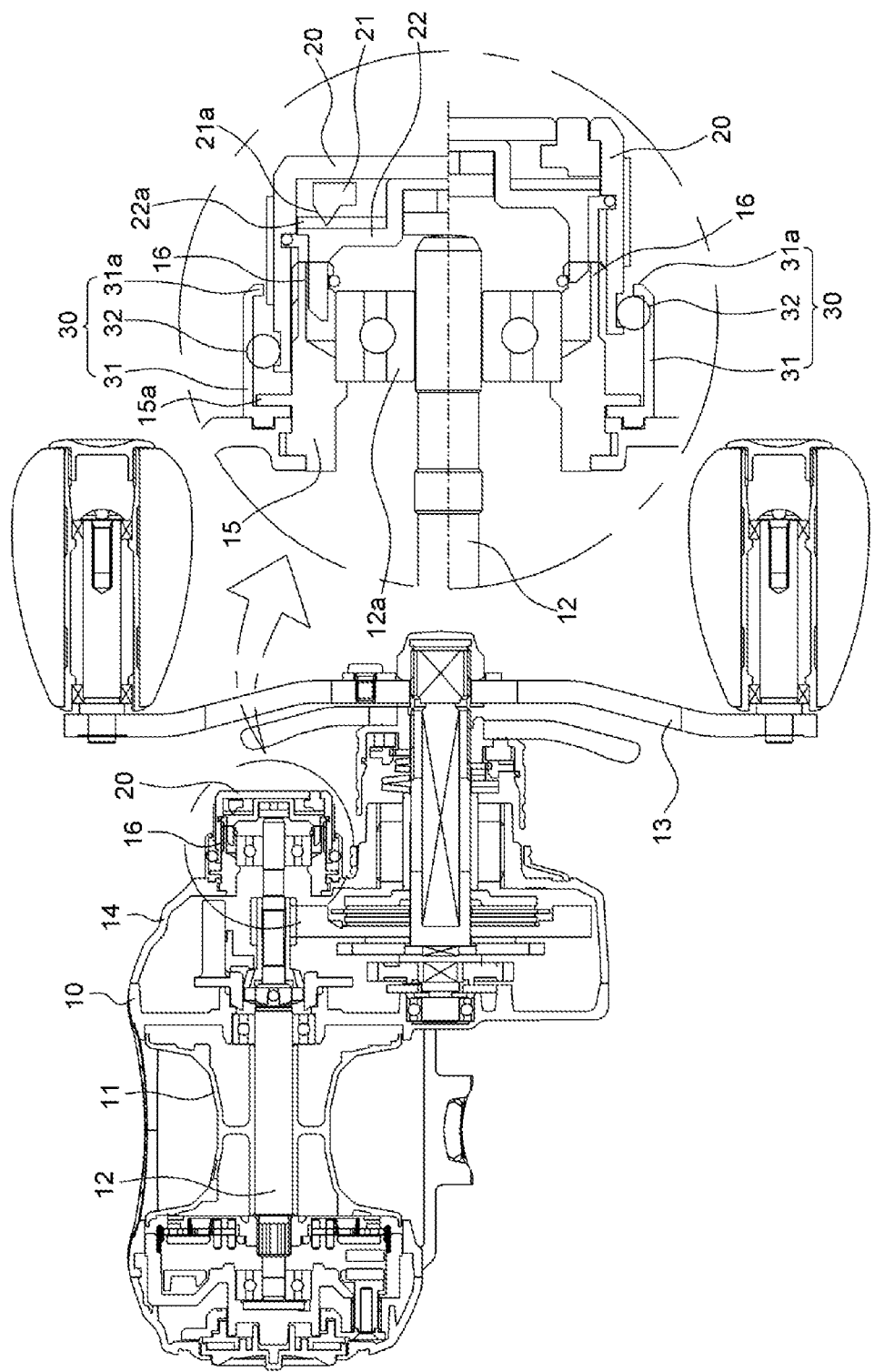
FIG. 1 is a plan view showing a fishing reel according to a first embodiment of the present invention and an enlarged view showing main parts.

The present invention may be modified in various ways and implemented by various exemplary embodiments, so that specific exemplary embodiments are shown in the drawings and will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Terms such as 'a first ~' and 'a second ~' are used only for the purpose for distinguishing a constitutive element from other constitutive element, but constitutive element should not be limited to a manufacturing order, and the terms described in the detailed description of the invention may not be consistent with those described in the claims.

For convenience of the description of a fishing reel having a tension nut retainer according to the present invention, when an approximate direction rather than a precise direction is specified with reference to FIG. 1, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereinbelow, a fishing reel having a tension nut retainer according to the present invention will be described with reference to the accompanying drawings.

Figure 5:
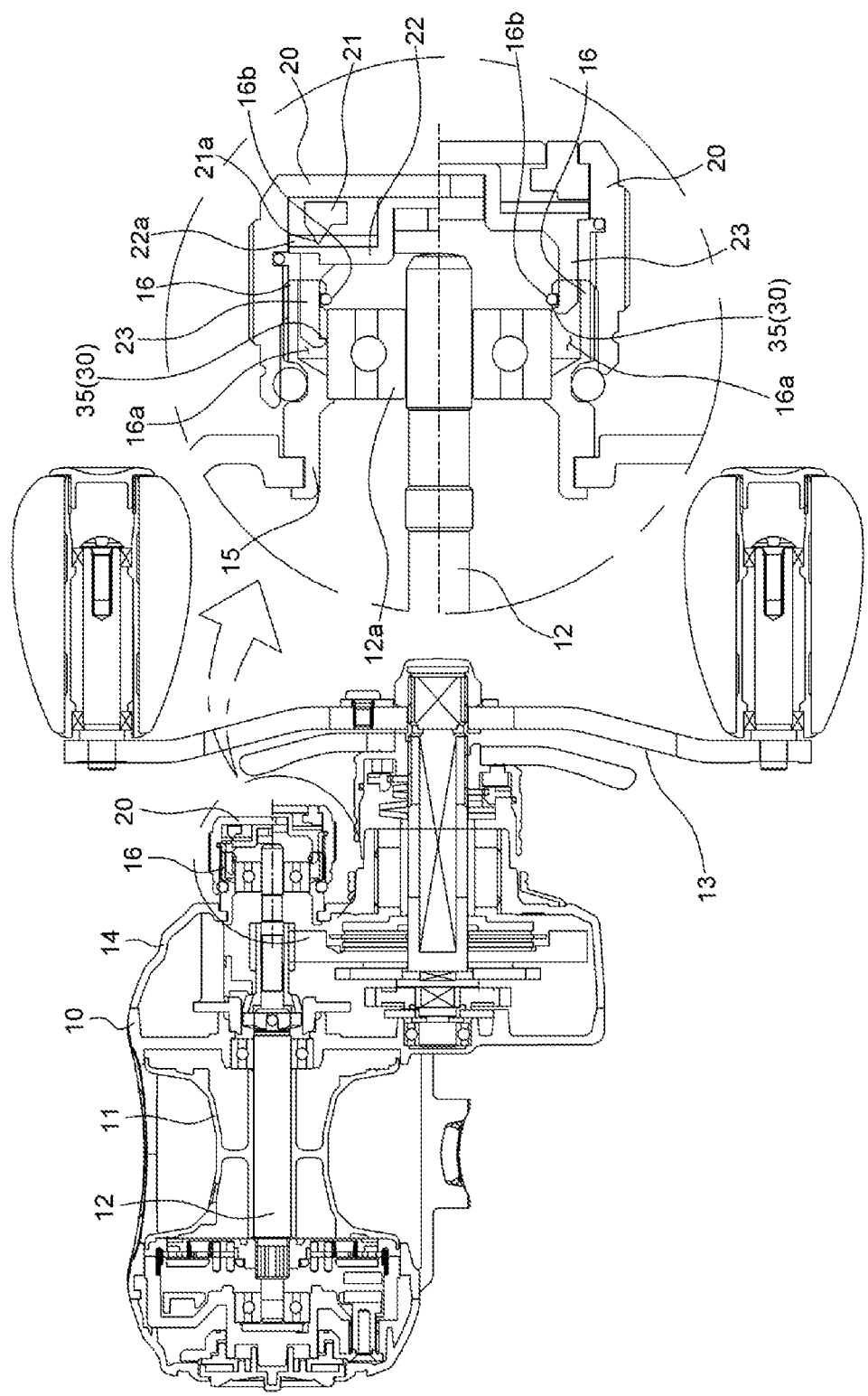
FIG. 5 is a plan view showing a fishing reel according to a second embodiment of the present invention and an enlarged view showing main parts.
Figure 6A:
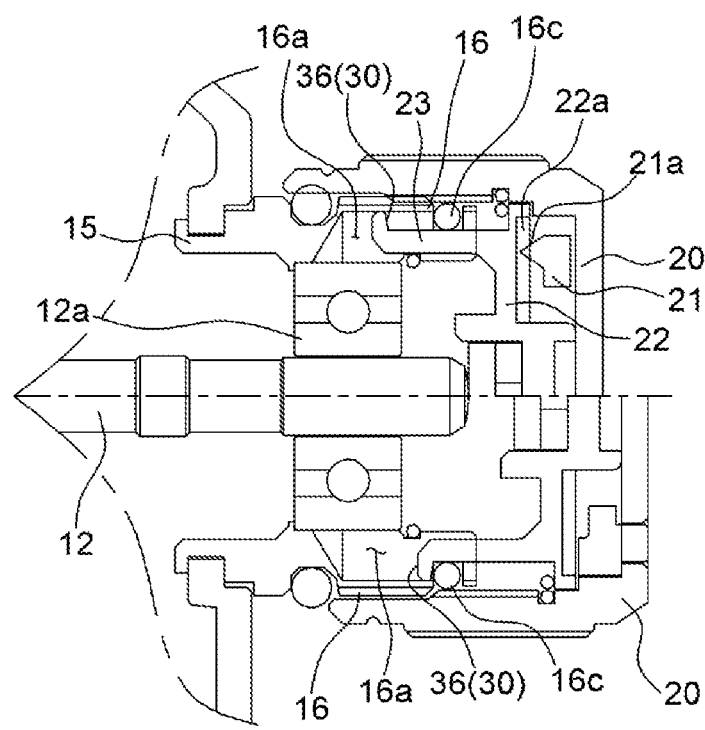
FIGS. 6A to 6B are cross-sectional views showing main parts of modifications of the second embodiment of the present invention.
Figure 6B:
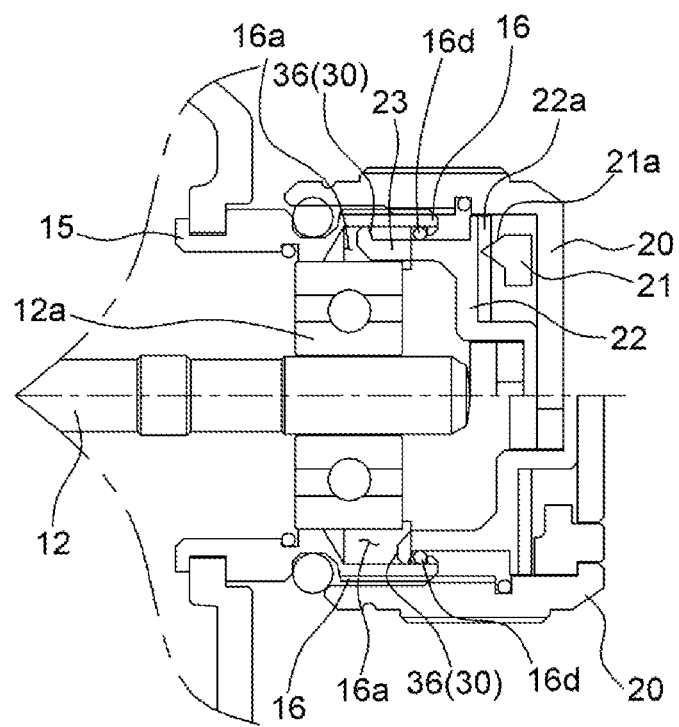
Figure 7:
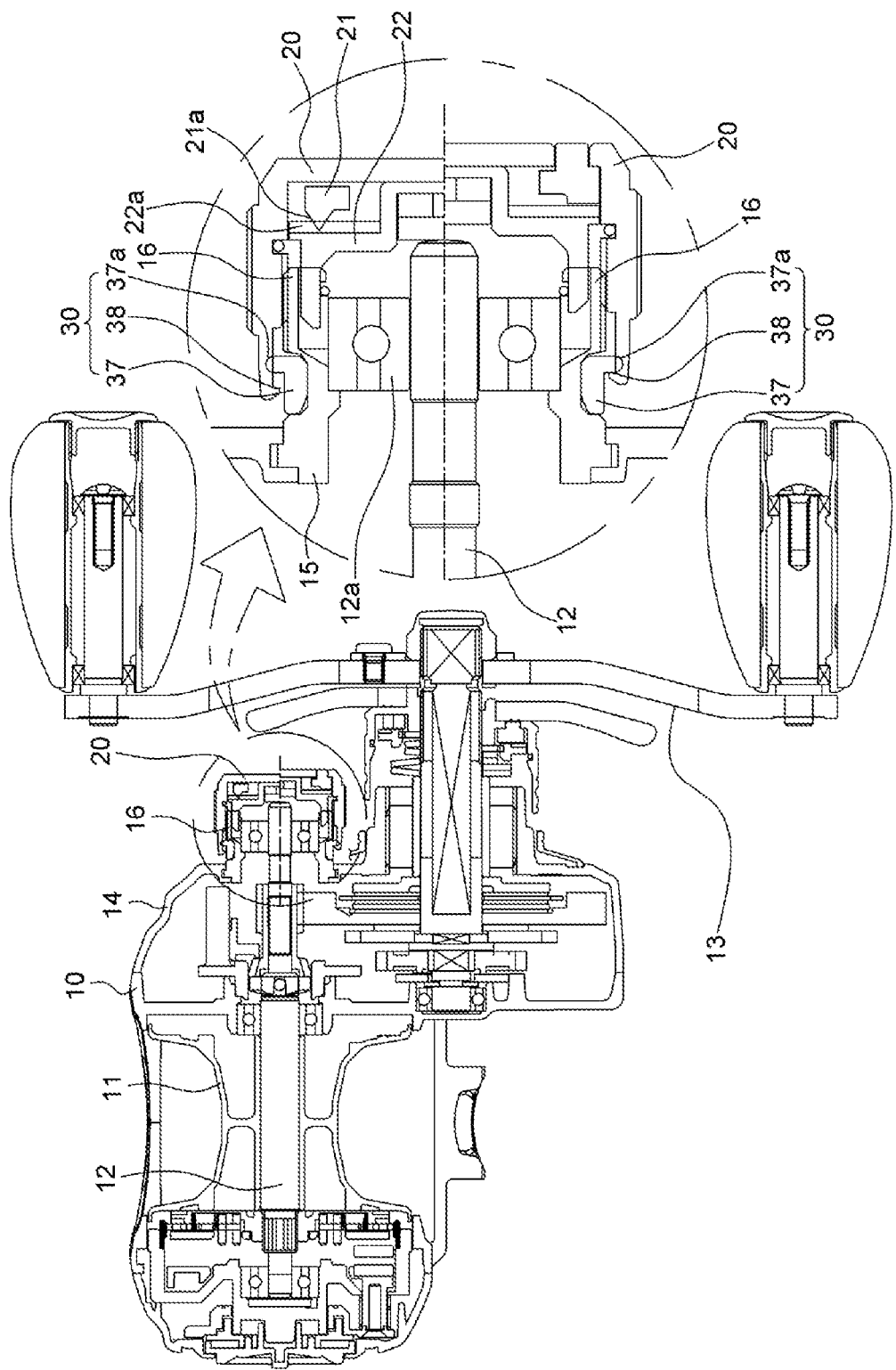
FIG. 7 is a plan view showing a fishing reel according to a third embodiment of the present invention and an enlarged view showing main parts.
Figure 8:
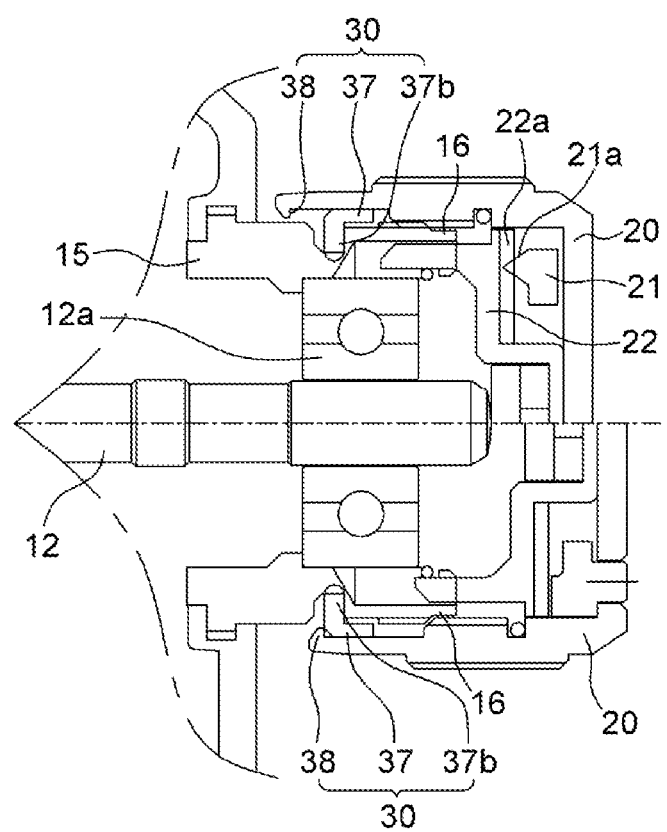
FIG. 8 is a cross-sectional view showing main parts of a modification of the third embodiment of the present invention.

The present invention relates to a fishing reel having a tension nut 20 for adjusting torque of a spool. A first embodiment of the present invention is shown in FIGS. 1A, 2A to 2D, 3, and 4A to 4C, a second embodiment is shown in FIGS. 5, 6A, and 6B, and a third embodiment is shown in FIGS. 7 and 8.

Referring to the figures, frame 10 in which a spool 11 is mounted includes: a tension nut 20 disposed on a side cover 14 at a side of the frame 10 to adjust torque of the spool 11; and a retainer 30 preventing separation of the tension nut 20 when the tension nut 20 is rotated to maximize the torque of the spool 11.

The frame 10 has a spool mount at the center and both ends of a shaft 12 of the spool 11 are fitted to both side covers of the spool mount, so when a handle 13 is operated, the spool 11 on the shaft 12 is rotated forward and backward, whereby a fishing line is wound on or unwound from the spool 11.

Torque of the spool 11 is adjusted by increasing or decreasing pressure (tension) applied to a first end of the shaft 12.

The part that is used to adjust the torque of the spool 11, that is, the tension applied to the spool shaft 12 is the tension nut 20.

The tension nut 20 has a thread on the inner side, so it is thread-fastened to a threaded-portion on the outer side of the nut mount 16 disposed in the frame 10. Accordingly, when the tension nut 20 is rotated in two directions, it is moved in the axial direction of the spool shaft 12.

That is, when the tension nut 20 is loosened to be moved toward a first end of the nut mount 16 (out of the frame 10), pressure applied to a bearing 12a in which the first end of the spool shaft 12 is fitted is reduced, so the torque of the spool 11 is increased.

On the contrary, when the tension unit 20 is tightened toward a second end of the nut mount 16 (into the frame 10), the pressure applied to the bearing 12a is increased, so the torque of the spool 11 is decreased.

According to the fishing reel of the present invention, a clicker that clicks when the tension nut 20 is rotated is disposed in the tension nut 20, and a separate metal 15 supporting the bearing 12a is coupled to the side cover 14 and a threaded-portion is formed on the outer side of the metal 15 so that it functions as the nut mount 16.

Figure 10:
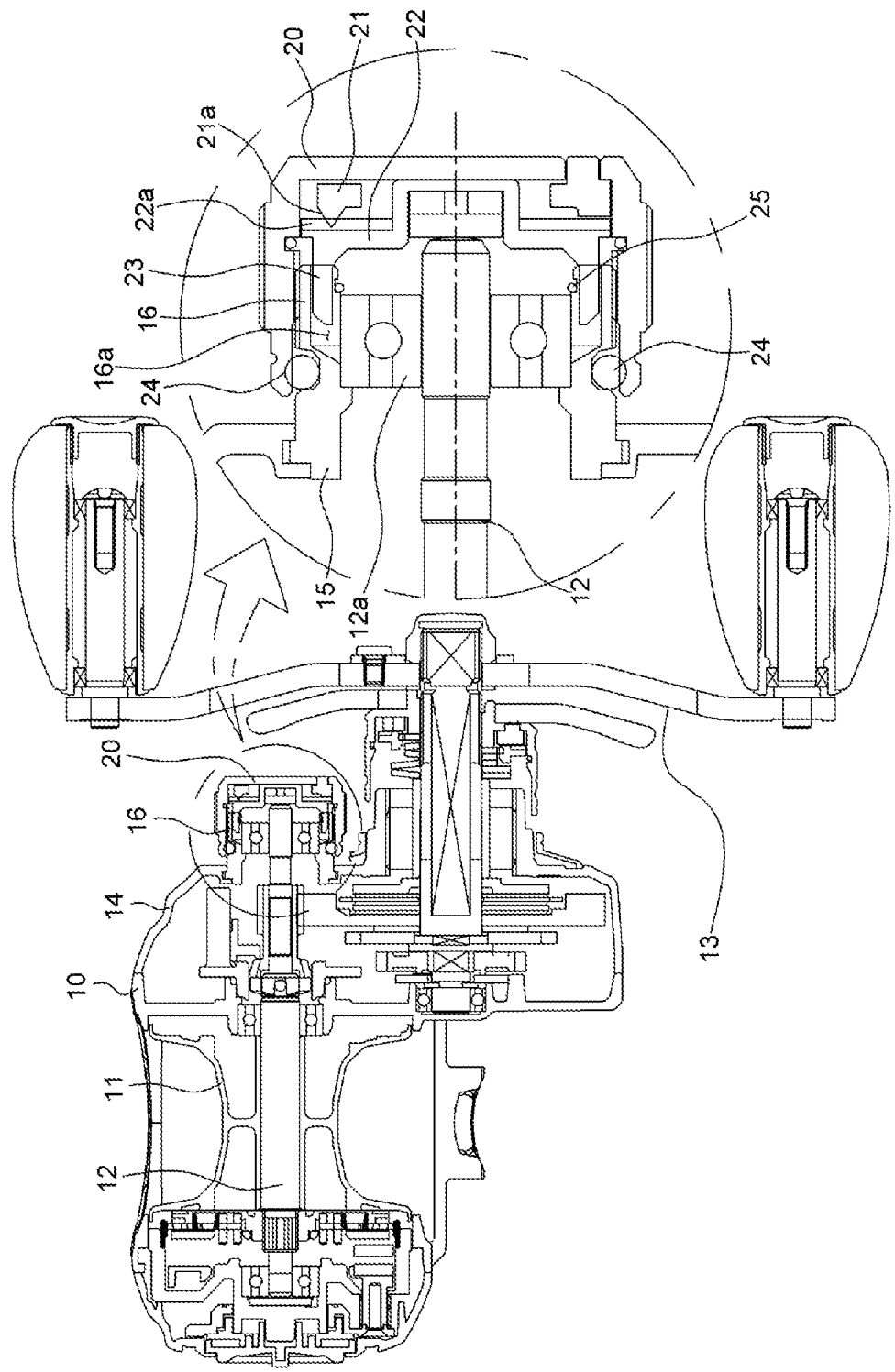
FIG. 10 provides a plan view showing a fishing reel and a cross-sectional view showing main parts for describing a tension nut structure of the related art.

In the fishing reel having this structure, as shown in FIG. 10, the tension nut 20 of the related art is simply thread-fastened to the nut mount 16, so when the tension nut 20 is loosened to maximize the torque of the spool 11, the tension nut 20 is fully separated from the nut mount 16.

Accordingly, when a user fishes with the tension nut loosened to the end, the tension nut 20 may be unexpectedly loosened and separated due to contact or vibration during fishing, so there is a possibility of loss of the tension nut 20.

Accordingly, the present invention proposes a tension nut retainer 30 that prevents the tension nut 20 from separating by being locked to the structure of the frame 10 when the tension nut 20 is moved to the first end of the nut mount 16.

The structure of the frame 10 is a concept including all of separate parts fixed to the frame 10 (or a portion of the frame 10) to lock the tension nut 20 by coming in contact with the tension nut 20 and embodiments relates to the structure will be described below.

First, a first embodiment is described with reference to FIGS. 1 and 2A to 2D.

In the first embodiment, a retainer 30 according to the present invention includes: a cap 31 coupled to the frame 10 to cover the nut mount 16 to form a gap in which a second end of the tension nut 20 is inserted, and having a retaining step 31a protruding from the inner side; and a retaining portion formed on the outer side of the tension nut 20 and protruding from the retaining step 31a.

First, the cap 31 is disposed to cover the outer side of the metal 15 and the tension nut 20 is inserted in an insertion space between the metal 15 and the cap 31 and thread-fastened to the nut mount 16.

The retaining step 31a is bent inward at an end of the inner side of the cap 31.

The retaining portion is composed of retaining rings 32 and 33 that are O-ring or a C-ring and protrudes on the outer side of the tension nut 20 to be locked to the retaining step 31a.

Fitting grooves are formed at the second end on the outer side of the tension nut 20 and the retaining rings 32 and 33 are fitted in the fitting grooves.

The cap 31 having the retaining step 31 and the retaining rings 32 and 33 are locked to each other, thereby constituting the retainer 30.

Accordingly, when the tension nut 20 is tightened or loosened, the retaining rings 32 and 33 fixed on in close contact with the outer side of the tension nut 20 are moved with the tension nut 20 on the outer side of the nut mount 16.

When the tension nut 20 is loosened to maximize the torque of the spool 11, the retaining rings 32 and 33 are locked to the retaining step 31a, so the tension nut 20 cannot be separated from the nut mount 16.

The retaining ring 32 shown in the right enlarged cross-sectional view and in [A] of FIGS. 2A to 2D is an O-ring made of a flexible material (rubber etc.) with predetermined elasticity and formed in a complete ring shape.

The retaining ring 32 that is an O-ring secures waterproofness between the cap 31 and the tension nut 20 and prevents separation of the tension nut 20 by being locked to the retaining step 31a when the tension nut 20 is loosened.

The O-ring is forcibly fitted into the cap 31 when the tension nut 20 with the O-ring fitted thereon by elasticity of the material is thread-fastened to the tension mount 16, with the cap 31 coupled to the side cover 14, and when the tension nut 20 is forcibly loosened to separate the tension nut 20 for maintenance of the fishing reel, the O-ring is pulled out over the retaining step 31a, whereby the tension nut 20 is separated.

As for the cap 31 shown in the right enlarged view of FIG. 1, the cap 31 is coupled and fixed when the metal 15 is coupled to the side cover 14 by a fixing portion 15a protruding from the outer side of the metal 15, and then the tension nut 20 is thread-fastened to the cap 31.

Figure 2A:
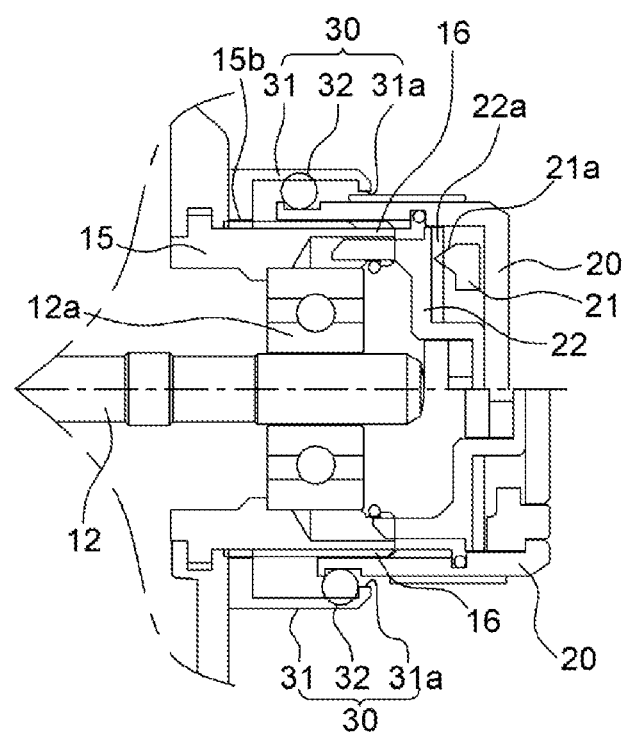
FIGS. 2A to 2D, and FIG. 3 are enlarged views showing main parts of modifications of the first embodiment of the present invention.

As for the cap 31 shown in FIG. 2A, the cap 31 is assembled with the metal 15 by a threaded-portion 15b of the metal and then the tension nut 20 is thread-fastened to the cap 31.

According to this structure in which the cap 31 is assembled and then the tension nut 20 is assembled, assembly can be more convenient by using an O-ring for the retaining ring 32.

Figure 4A:
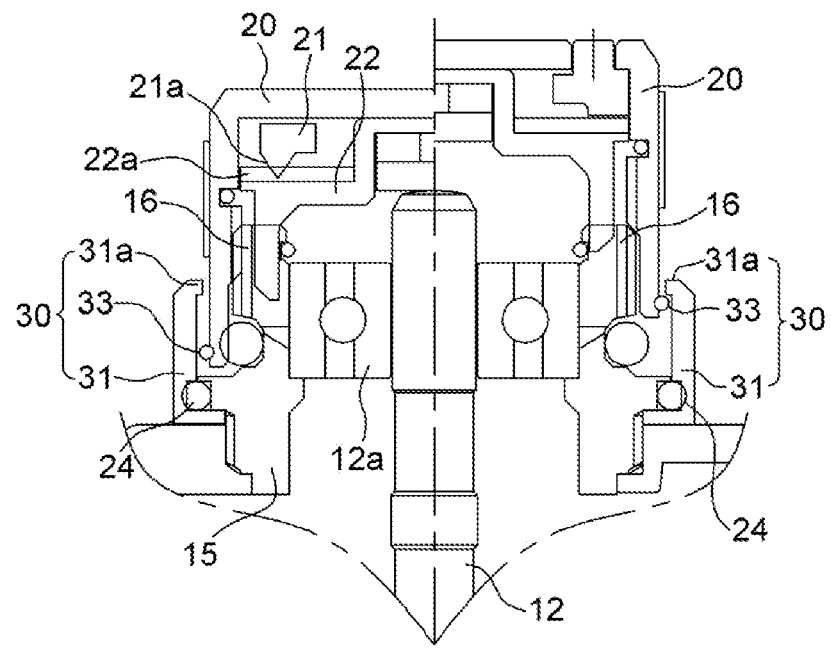
FIGS. 4A to 4C are a cross-sectional view, a plan view, and a side view enlarging main parts of a modification of the first embodiment of the present invention.

As for the cap 31 shown in FIG. 4A, in similar structure to FIG. 1, the cap 31 can be freely rotated and waterproofness is secured by disposing an O-ring 24 on the outer side of the metal 15 instead of the fixing portion 15a.

Figure 2B:
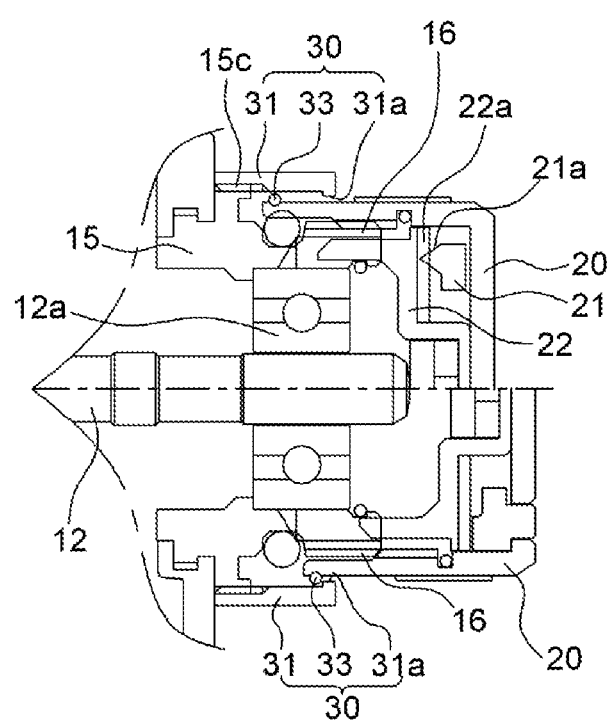
Figure 2C:
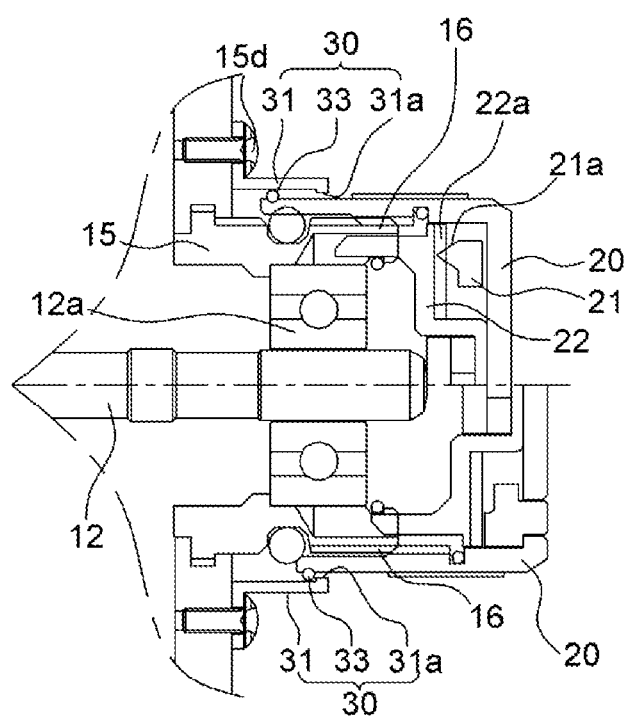

Further, the retaining ring 33 shown in FIGS. 2B and 2C is a C-ring made of metal having predetermined elasticity (a thin wire) with both ends separated.

The retaining ring 33 that is a C-ring secures waterproofness for the nut mount 16 through an O-ring (not indicated) fixed on the outer side of the metal 15. Further, the C-ring (retaining ring 33) prevents separation of the tension nut 20 while moving with the tension nut 20.

As for the cap 31 shown in FIG. 2B, the projective threaded-portion 15c is formed on the outer side of the metal 15 separately from the nut mount 16, the tension nut 20 is thread-fastened first to the nut mount 16 of the metal 15, and then the cap 31 is thread-fastened over the tension nut 20 (the assemblage can be performed in the opposite sequence).

As for the cap 31 shown in FIG. 2C, the cap 31 is fixed to the side cover 14 through a bolt 15d, in which the tension 20 is first thread-fastened to the nut mount 16 of the metal 15 and then the cap 31 is bolted over the tension nut (the assemblage can be performed in the opposite sequence).

As described above, when the cap 31 can be assembled regardless of the assemblage sequence of the cap 31 and the tension nut 20, the retaining ring 33 can be formed in a C-ring shape.

Obviously, since it is one of the objects of the present invention to prevent separation of the tension nut 20, using the retaining rings 32 and 33 and the retaining steps 31a of the cap 31, it is clearly possible to appropriately select an O-ring or a C-ring to fit to the assembly method or sequence of the cap 31. Accordingly, the right of the present invention should not be narrowly interpreted by the detailed coupling structure of the cap 31 and selection of an O-ring or a C-ring for the retaining rings 32 and 33.

Figure 2D:
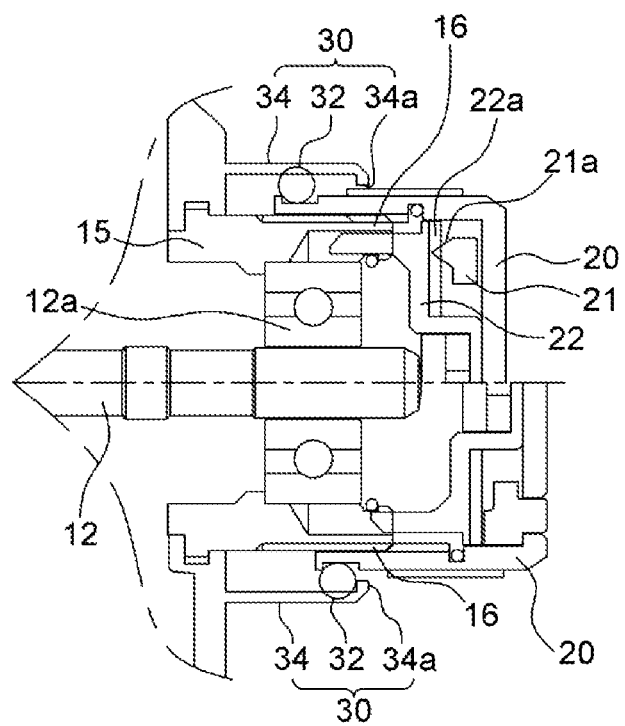

As an example, another modification using the retaining ring (O-ring) is shown in FIG. 2D. As for the cap 34 shown in FIG. 2D, the cap 34 is not separated and integrally connected to the side cover 14 and a retaining step 34a is formed at an end of the integrated cap 31.

Figure 3:
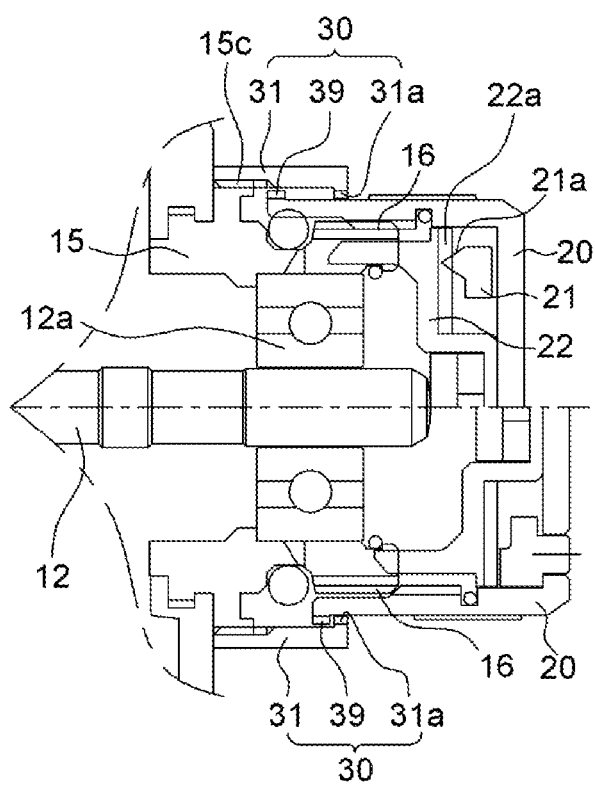

Further, as shown in FIG. 3, the retaining step 31a has a ridge (not indicated) on the inner side.

The retaining portion is a threaded-tap 39 that can be engaged with the ridges.

The threaded-tap 39 is coupled to idle in the insertion portion.

That is, the projective ridges (retaining tap 31a) and the threaded-tap 39 are formed to correspond to the tension nut 20 and the cap 31, and the threaded-tap 39 is not thread-fastened and idles in the cap 31.

Accordingly, in normal use, since the threaded-tap 39 (that is, the tension nut 20) is not threaded-fastened to the cap 31, when the tension nut 20 is tightened or loosened, the threaded-tap 39 is also freely rotated.

When the tension nut 20 is loosened to maximize the torque of the spool 11, the threaded-tap 39 is locked to the ridges of the retaining tap 31a, thereby preventing separation of the tension nut 20.

The retainer 30 shown in FIG. 3 is provided to make it possible to forcibly separate the tension nut 20 separately from the cap 31.

That is, when the fishing reel is wet with seawater during fishing, the metal 15 and/or the cap 31 may be corroded or the cap 31 may be fixed and may not separated by salt. In this case, when a user forcibly rotates and pulls out the tension nut 20, the threaded-tap 20 is engaged with the ridges of the retaining step 31a, so the tension nut 20 can be separated.

Figure 4B:
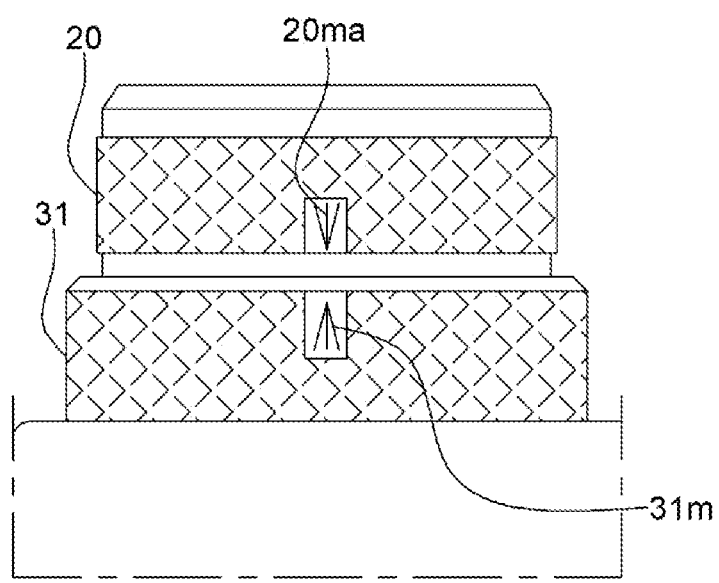
Figure 4C:
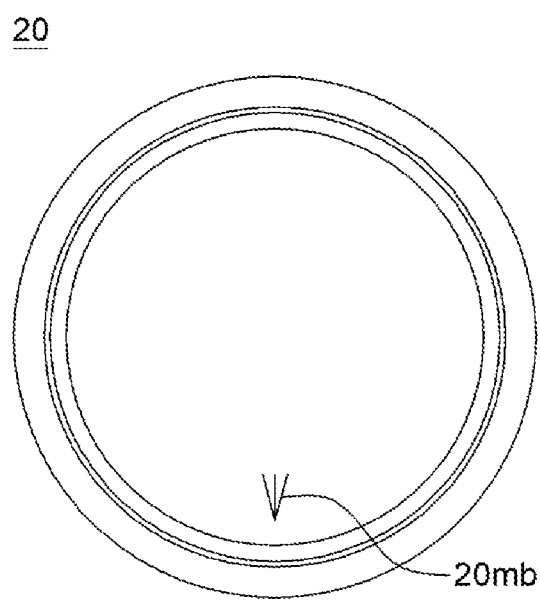

When the cap 31 can be freely rotated, as shown in FIG. 4A, marks 20ma, 20mb, and 31m may be formed on the tension nut 20 and the cap 31 so that the rotational position of the tension nut 20 is indicated, as shown in FIGS. 4B and 4C.

Accordingly, a user can connect a lure to use to a fishing line and set tension suitable for the lure by rotating the tension nut 20 to fish.

When there is a need for changing the lure, the user can replace the lure with the cap 31 turned such that the mark 31m on the cap 31 is aligned with the mark 20ma on the tension nut 20, then turn the tension nut 20 to set again the tension to be suitable for the new lure.

When replacing the lure with the previous lure during fishing, the user can turn the tension nut 20 such that the mark 20ma on the tension nut 20 is aligned with the mark 31m of the cap 31 at the initially set position. Accordingly, it is possible to fish without readjusting the tension every time changing lures.

Although, in the figures, the marks 20am, 20mb, and 31m are formed on the outer side and the top of the tension nut 20 and the outer side of the cap 31, the marks are not limited in position or shape and the rotational position of the tension nut 20 has only to be indicated by the mark 31m of the cap 31.

Next, a second embodiment of the present invention is described with reference to FIGS. 5, 6A, and 6B.

Before the second embodiment is described, as described above, a clicker is disposed in the tension nut 20 of the present invention.

The clicker includes a click spring 21 fixed by a click holder (not shown) in the tension nut 20 to be rotated with the tension nut 20 and an inner plate 22 moved with the tension nut 20 without rotating.

A projection 21a is formed on the inner side, which is in contact with the inner plate 22, of the click spring 21.

A prominence/depression portion 22a is circumferentially formed on the outer side, which the click spring 21 is in contact click spring 21, of the inner plate 22.

The projection 21a elastically comes in contact with the prominence/depression portion 22a.

When the click spring 21 is rotated with the tension nut 20, the projection 22a continuously hits against the prominence/depression portion 22a by elasticity, thereby generating a specific clicking sound (refer to Korean Patent No. 10-1218315 by the applicant(s) for the details in relation to this configuration)

Accordingly, a locking structure of the retainer 30 is implemented by the inner plate 22.

The second embodiment using this configuration is shown in the right enlarged cross-sectional view of FIG. 5 and the enlarged cross-sectional views of FIGS. 6A and 6B.

A fitting hole 16a is formed through the nut mount 16 in the axial direction of the spool shaft 12.

The tension nut 20 includes the inner plate 22 on the inner side, moving with the tension nut 20, and having a fitting projection 23 protruding from a second side to be inserted in the fitting hole 16a.

The retainer 30 is composed of hook portions 35 and 36 protruding from the outer side or the inner side of the fitting projection 23 to be locked to a first end of the fitting hole 16a.

That is, the hook portions 35 and 36 are formed at the inner plate 22 that is moved along the nut mount 16 together with the tension nut 20.

When the tension nut 20 is loosened to maximize the torque of the spool 11, the hook portion 35 is locked to the end of the fitting hole 16a, so the tension nut 20 cannot be separated from the nut mount 16.

Referring to the right enlarged cross-sectional view of FIG. 5, a hook portion 35 protrudes from an end of the inner side of the fitting projection 23 and a C-ring 16b is disposed at the end of the fitting hole 16a such that the hook portion 35 is locked to the C-ring.

Referring to the enlarged cross-sectional views of FIGS. 6A and 6B, a hook portion 36 protrudes from an end of the outer side of a fitting projection 23 and an O-ring 16c or a C-ring 16d is disposed at the end of the fitting hole 16a such that the hook portion 36 is locked to the O-ring or the C-ring.

Obviously, an O-ring may be used instead of the C-ring in the structure shown in the right enlarged view of FIG. 5.

The second embodiment was described herein, using the inner plate 22 that is provided as a member for clicking in the tension nut 20, but the inner plate 22 may be individually provided, not as a member for clicking but to prevent separation of the tension nut 20.

Next, a third embodiment of the present invention is described with reference to FIGS. 7 and 8.

As the third embodiment, the retainer 30 of the present invention is composed of a retaining ring 37 fitted on the outer side of the nut mount 16 and a locking step protruding inward from a second end of the tension nut 20 to be locked to the retaining ring 37.

That is, as shown in FIG. 10, an O-ring 24 is fitted on the nut mount 16 to secure waterproofness between the tension nut 20 and the metal 15.

As shown in FIGS. 7 and 8, the locking step 38 is formed on the inner side of the tension nut 20.

When the tension nut 20 is loosened to maximize the torque of the spool 11, the locking step 38 is locked to the retaining ring 37, so the tension nut 20 cannot be separated from the nut mount 16.

The retaining ring 37 shown in the right enlarged cross-sectional view of FIG. 7 has a retaining step 37a protruding outward at a first end such that the locking step 38 is locked to the retaining step 37a.

In the enlarged view of FIG. 8, a fitting groove is formed on the outer side of the nut tension 16 and a fitting portion 37b protruding inward at a second end of the retaining ring 37 is fitted in the fitting groove, so the locking step 38 is locked to the outer end of the fitting portion 37b.

The retaining ring 37 is made of a flexible material having predetermined elasticity like common O-rings. The retaining ring 37 is fitted in a fitting groove on the metal 15, the tension nut 20 is thread-fastened over the retaining ring such that the retaining step 37a is forcibly fitted inside the locking step 38.

It is possible both to secure waterproofness and prevent separation of the tension unit 20 by the retaining ring 37.

Further, though not shown in the figures, the retaining ring 37 is fixed to the tension nut 20 and the fitting groove formed on the outer side of the metal 15 to insert the retaining ring 37 is made wider than the thickness of the retaining ring 37 so that the retaining ring 37 can be rotated with the tension nut 20. In this case, separation of the tension nut 20 is prevented by the retaining ring 37 fitted in the fitting groove.

If necessary, when the tension nut 20 is forcibly rotated to be loosened with the torque of the spool 11 maximized, the retaining ring 37 is compressed by the elasticity of the material, separated out of the fitting groove, and pulled out of the nut tension 16, so the tension nut 20 and the retaining 37 both can be separated. On the other hand, in the first embodiment of the present invention, the retaining ring 32 that is an O-ring is in close contact with the cap 31, thereby securing waterproofness. In this case, if friction force between the cap 31 and the retaining ring 32 is increased, that is, if the retaining ring 32 is compressed and the contact area is increased, the retaining ring 32 cannot be moved due to friction force when the tension nut 20 is tightened or loosened, so it cannot be separated from the tension nut 20.

When the retaining ring 32 is separated in this way, it loses the function as the retainer 30.

Accordingly, the present invention employs a friction reduction ring 40 that can reduce friction force between the cap 31 and the retaining ring 32.

Figure 9:
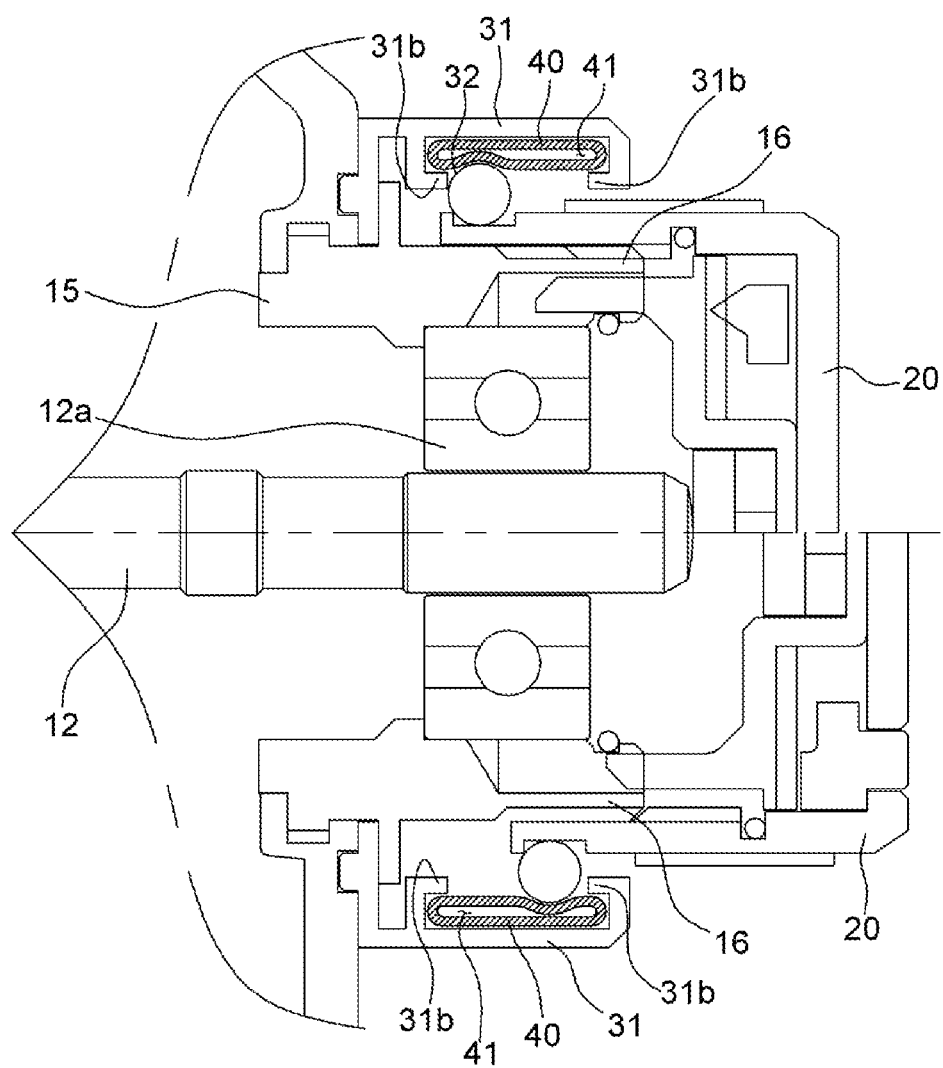
FIG. 9 is a cross-sectional enlarged view a friction reducer of the present invention.

As shown in FIG. 9, the friction reduction ring 40 is a ring-shaped tube having an internal space 41 filled with gas or liquid (hereafter, referred to as fluid in combination) at a predetermined pressure.

The retaining ring 32 is elastically supported in contact with the inner side of the friction reduction ring 40, with the friction reduction ring 40 fitted on the inner side of the cap 31.

That is, the friction reduction ring 40 is a tube-shaped oblong ring member of which the cross-section corresponds to the movement distance of the retaining ring 32 and the internal space 41 is filled with fluid under a predetermined pressure so that the friction reduction ring 40 can be deformed.

Mounting projections 31b having an L-shape and corresponding to each other are formed at both ends of the cap 31 to mount the friction reduction ring 40.

The friction reduction ring 40 is fitted between the mounting projections 31b.

As the friction reduction ring 40 is employed, the retaining ring 32 is elastically in contact with the friction reduction ring 40 by the pressure of the fluid in the internal space 31, so deformation of the retaining ring 32 by close contact is not generated and only the friction reduction ring 40 is deformed and roll-supports the retaining ring 32 in contact with the retaining ring 32.

That is, without deformation of the retaining ring 32, only a portion of the friction reduction ring 40 which is in contact with the retaining ring 32 is compressed with the other portion inflated, and the retaining ring 32 and the friction reduction ring 40 are in close contact with each other.

Accordingly, in this contact state, waterproofness cannot be secured by the contact of the retaining ring 32 and the friction reduction ring 40.

When the retaining ring 32 is moved by the tension nut 20, the compressed portion of the friction reduction ring 40 is also moved due to the pressure maintained in the internal space 41 (that is, the friction reduction ring 40 is deformed by the retaining ring 32 ring 32) and pushes (that is, elastically support) the retaining ring 32 inward (in the movement direction).

By minimizing the contact area of the retaining ring and the friction reduction ring 40 and elastically supporting the retaining ring 32 in the movement direction, the friction between the rings is minimized, so the retaining ring 32 can be smoothly moved.

Though not shown in the figures, the friction reduction ring 40 can be applied to all portions (for example, the cap 34 and the tension nut 20) where a ring and another member are in contact with each other and any one of them is moved, such as the retaining ring 33 of the first embodiment, the O-ring 16c or the C-rings 16b and 16d of the second embodiment, and the retaining step 37a formed at the retaining ring 37 of the third embodiment.

Although a fishing reel having a tension nut retainer having a specific shape and structure with reference to the accompanying drawings, the present invention may be changed, modified, and replaced in various ways by those skilled in the art, and the change, modification, and replacement should be construed as being included in the protective range of the present invention.

What is claimed is:

1. A fishing reel including a tension nut retainer adjusting torque of a spool, the fishing reel comprising:
   a frame having a nut mount;
   a tension nut thread-fastened to an outer side of the nut mount and moving in an axial direction of a spool shaft such that a distance can be adjusted when being rotated in two directions; and
   a retainer locking the tension nut to a structure of the frame to prevent the tension nut from being separated from the nut mount when the tension nut is loosened and moved from a first end of the nut mount,
   wherein the retainer includes:
   a cap coupled to the frame to cover the nut mount to form a gap in which a second end of the tension nut is inserted, and having a retaining step protruding from an inner side thereof; and
   a retaining portion formed on an outer side of the tension nut and protruding to be locked to the retaining step,
   the retaining step has ridges on an inner side thereof,
   the retaining portion is a threaded tap disposed on the outer side of the tension nut to be engaged with the ridges, and the threaded tap is coupled to idle in an insertion portion without being thread-fastened to the ridges of the retaining step.

2. The fishing reel of claim 1, wherein marks are formed on the tension nut and the cap to indicate a rotational position of the tension nut, and the tension nut is turned to set again tension, with the cap turned such that a first mark on the cap is aligned with a first mark on the tension nut, and then the tension nut is rotated such that the first mark on the tension nut is aligned with the first mark on the cap at an initially set position.

3. The fishing reel of claim 1, wherein the retaining portion is composed of retaining rings that are an O-ring or a C-ring.

4. The fishing ring of claim 3, further comprising a friction reduction ring reducing friction force between the cap and the retaining rings, wherein the friction ring is a ring-shaped oblong tube corresponding to a movement distance of the retaining rings and has an internal space filled with fluid at a predetermined pressure, mounting projections having an L-shape and facing each other are formed at both ends of the cap and the friction reduction ring is fitted between the mounting projections, and the retaining rings are elastically supported in contact with an inner side of the friction reduction ring, with the friction reduction ring fitted on the inner side of the cap.

\* \* \* \* \*